US011653661B2

(12) United States Patent
Jimenez-Flores et al.

(10) Patent No.: US 11,653,661 B2
(45) Date of Patent: May 23, 2023

(54) METHODS AND COMPOSITIONS RELATED TO A STABLE BLEND OF CASEIN AND PLANT PROTEINS WITH IMPROVED PHYSICAL AND FLAVOR CHARACTERISTICS

(71) Applicant: Ohio State Innovation Foundation, Columbus, OH (US)

(72) Inventors: Rafael Jimenez-Flores, Columbus, OH (US); Joana Ortega-Anaya, Columbus, OH (US); Alba Mayta Apaza, Columbus, OH (US); Stiphany Tieu, Columbus, OH (US)

(73) Assignee: Ohio State Innovation Foundation, Columbus, OH (US)

(*) Notice: Subject to any disclaimer, the term of this patent is extended or adjusted under 35 U.S.C. 154(b) by 294 days.

(21) Appl. No.: 16/994,058

(22) Filed: Aug. 14, 2020

(65) Prior Publication Data
US 2021/0045398 A1    Feb. 18, 2021

Related U.S. Application Data

(60) Provisional application No. 63/004,113, filed on Apr. 2, 2020, provisional application No. 62/888,014, filed on Aug. 16, 2019.

(51) Int. Cl.
*A23C 9/152* (2006.01)
*A23J 1/20* (2006.01)
*A23J 1/14* (2006.01)

(52) U.S. Cl.
CPC .............. *A23C 9/1526* (2013.01); *A23J 1/14* (2013.01); *A23J 1/202* (2013.01)

(58) Field of Classification Search
CPC ............ A23C 9/1526; A23J 1/14; A23J 1/202
USPC ........................................................ 426/598
See application file for complete search history.

(56) References Cited

FOREIGN PATENT DOCUMENTS

WO    WO-2014044990 A1 *  3/2014  .............. A23J 1/006

OTHER PUBLICATIONS

Translation of WO 2014044990 A1 (Year: 2014).*
Laca, Anna-Lisa. "USDA Pushes 2019 Milk Price, Production Forecasts Higher." Farm Journal's Milk Business, Farm Journal & Milk Magazine, Sep. 12, 2018, 1 page.
Ingredient Insights: The High-Protein Trend—Responding to Opportunities and Challenges in Meeting Demand for High-Protein Products Made with on-Trend and Emerging Ingredients 1 Markets Insider. Business Insider, Business Insider, Nov. 12, 2018, Summary, 2 pages.

* cited by examiner

*Primary Examiner* — Brent T O'Hern
(74) *Attorney, Agent, or Firm* — Meunier Carlin & Curfman LLC

(57) ABSTRACT

Disclosed herein is a process for preparing a stable suspension of a globular protein material in a dairy product. Also disclosed are products produced by this method.

15 Claims, 8 Drawing Sheets

METHODS AND COMPOSITIONS RELATED TO A STABLE BLEND OF CASEIN AND PLANT PROTEINS WITH IMPROVED PHYSICAL AND FLAVOR CHARACTERISTICS

CROSS-REFERENCE TO RELATED APPLICATIONS

This application claims benefit of U.S. Provisional Application No. 63/004,113, filed Apr. 2, 2020, and U.S. Provisional Application No. 62/888,014, filed Aug. 16, 2019, both of which are hereby incorporated herein by reference in their entirety.

FIELD

This disclosure generally relates to a process for blending casein and plant proteins, and products produced by this process.

BACKGROUND

Plant proteins, such as globulins and albumins from chia, are not naturally stable in aqueous solutions due to their intrinsic function in plants where they act as strong and resistant structural scaffolds prone to aggregate. These pose a challenge when utilizing plant protein in food systems.

In their native state, casein micelles exist as a colloidal suspension in milk and are known to have great stability in aqueous environments. They are known to interact with other proteins, such as plant proteins, increasing their stability in some models. However, the use of casein isolates and micellar casein ingredients has not reached the requirements needed to produce food systems with high stability and desirable functionality. What is needed in the art is a process for blending plant proteins and casein micelles to produce a stable product.

SUMMARY

In accordance with the purposes of the disclosed materials, compounds, compositions, articles, devices, and methods, as embodied and broadly described herein, the disclosed subject matter, in one aspect, relates to a process for preparing a stable suspension of globular protein material in a dairy beverage comprising: a) preparing globular protein material for addition to a dairy beverage comprising the following steps: i) obtaining globular protein material; ii) soaking globular protein material of step i) in liquid; iii) centrifuging globular protein material/liquid from step ii); iv) separating supernatant from pellet after centrifugation of step iii); v) retaining supernatant comprising soluble globular protein; b) preparing the dairy beverage for addition of soluble globular protein by adding sodium citrate to casein micelles and equilibrating the casein micelles, thereby obtaining swelled casein micelles; c) adding final product of step a) and final product of step b) to a dairy beverage; and d) homogenizing the mixture of step c), thereby obtaining a stable suspension of globular material in a dairy beverage.

Further disclosed is a product produced by the process described herein.

Additional advantages of the disclosed subject matter will be set forth in part in the description that follows, and in part, will be obvious from the description or can be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE FIGURES

The accompanying figures, which are incorporated in and constitute a part of this specification, illustrate several aspects described below.

FIG. 7A shows before processing (left side) and after (right side). Without processing, there was clear separation and sedimentation. There was a uniform colloidal system achieved from processing. FIG. 7B shows, from left to right: (1) skim milk, (2) skim milk+sodium citrate, (3) supernatant with soluble chia protein, (4) skim milk+chia protein, and (5) homogenized skim milk+chia protein (14 days).

DETAILED DESCRIPTION

Figure 1:
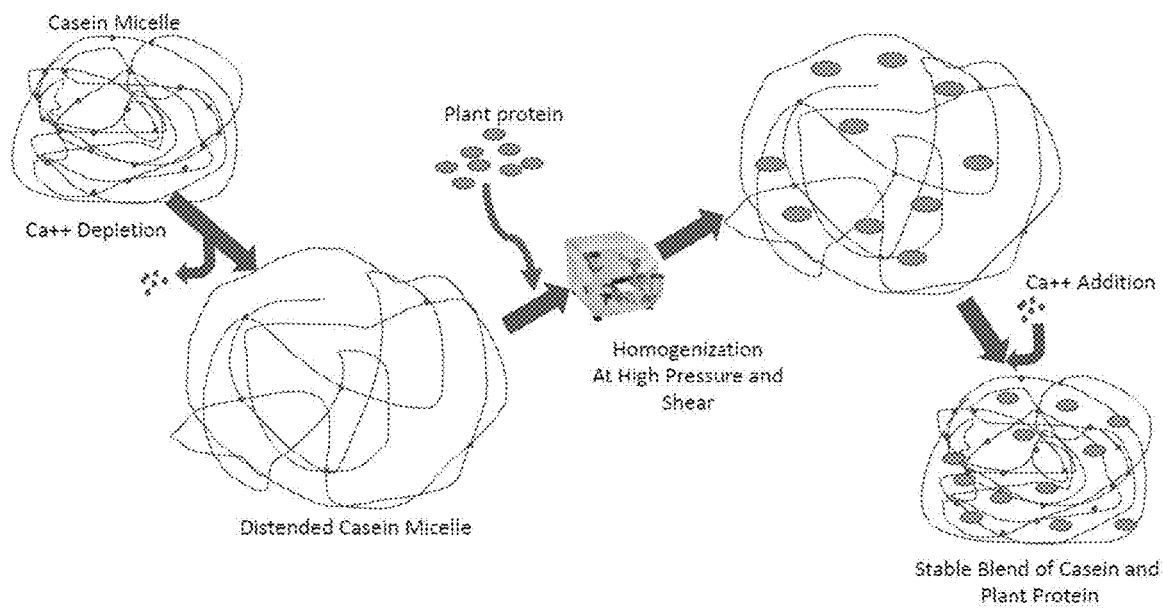
FIG. 1 shows a schematic of a process for producing a stable blend of casein and plant proteins.

The materials, compounds, compositions, and methods described herein may be understood more readily by reference to the following detailed description of specific aspects of the disclosed subject matter and the examples included therein and to the figures.

Before the present materials, compounds, compositions, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings:

Throughout the description and claims of this specification, the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "a polymer" includes mixtures of two or more such polymers, reference to "the component" includes mixtures of two or more such component, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another aspect includes from the one particular value and/or to the other particular value. Similarly, when values are expressed as approximations by use of the antecedent "about," it will be understood that the particular value forms another aspect.

References in the specification and concluding claims to parts by weight of a particular element or component in a composition denote the weight relationship between the element or component and any other elements or components in the composition or article for which a part by weight is expressed. Thus, in a compound containing 2 parts by weight of component X and 5 parts by weight component Y, X and Y are present at a weight ratio of 2:5 and are present in such ratio regardless of whether additional components are contained in the compound.

A weight percent (wt. %) of a component, unless specifically stated to the contrary, is based on the total weight of the formulation or composition in which the component is included.

The terms "casein" and "casein micelle" are used herein in their traditional meaning and relate to the most predominant phosphoprotein found in milk and cheese. Casein micelles have properties that make them a unique system for protein blending, including: • swelling at low temperatures, swelling at alkaline pH, and dissociating with the addition of calcium chelating agents.

By "globular protein" is meant any protein obtained from a non-dairy plant or animal source. The globular proteins disclosed herein can be from plant sources. The globular proteins can be soluble or dispersable plant proteins. For example, the plant source can be chia, rice, coconut, almond, soy, oat, hemp, peanut, pea, cashew, quinoa, or flax. The plant source can also be a seed, such as grape seeds or other seeds used in brewing or distilling. The globular proteins can also be obtained from animal sources, such as insects. Examples include, but are not limited to, beetles, caterpillars, bees, wasps, grasshoppers, locusts, crickets, cicadas, leafhoppers and bugs, termites, dragonflies, and flies.

By "dairy product" is meant any type of food produced from or containing the milk of mammals. They are primarily produced from mammals such as cattle, water buffaloes, goats, sheep, donkeys, camels, and humans. Dairy products include food items, such as yogurt, cheese, and butter. The dairy product can be, for example, milk, such as skim milk.

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers such as Aldrich Chemical Co., (Milwaukee, Wis.), Acros Organics (Morris Plains, N.J.), Fisher Scientific (Pittsburgh, Pa.), or Sigma (St. Louis, Mo.) or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989).

Also, disclosed herein are materials, compounds, compositions, and components that can be used for, can be used in conjunction with, can be used in preparation for, or are products of the disclosed methods and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a composition is disclosed and a number of modifications that can be made to a number of components of the composition are discussed, each and every combination and permutation that are possible are specifically contemplated unless specifically indicated to the contrary. Thus, if a class of components A, B, and C are disclosed as well as a class of components D, E, and F and an example of a composition A-D is disclosed, then even if each is not individually recited, each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to, steps in methods of making and using the disclosed compositions. Thus, if there are a variety of additional steps that can be performed it is understood that each of these additional steps can be performed with any specific aspect or combination of aspects of the disclosed methods, and that each such combination is specifically contemplated and should be considered disclosed.

Processes for Producing a Stable Blend of Globular Protein in a Dairy Product

FIG. 1 shows a schematic of the process for preparing a stable suspension of a globular protein material in a dairy product. This process can comprise the steps of a) preparing globular protein material for addition to a dairy product comprising the following steps: i) obtaining globular protein material; ii) soaking globular protein material of step i) in liquid; iii) centrifuging globular protein material/liquid from step ii); iv) separating supernatant from pellet after centrifugation of step iii); v) retaining supernatant comprising soluble globular protein; b) preparing the dairy product for addition of soluble globular protein by adding sodium citrate to casein micelles and equilibrating the casein micelles, thereby obtaining swelled casein micelles; c) adding final product of step a) and to the dairy product; and d) homogenizing the mixture of step c), thereby obtaining a stable colloidal suspension of globular material in a dairy product.

The globular protein disclosed herein can be obtained from any source. Globular proteins may be single peptide chains, two peptide chains, or more peptide chains which interact in the usual ways. A globular protein may have portions of the chains with helical structures, pleated structures, or completely random structures. Globular proteins are relatively spherical in shape as the name implies. In the art, globular proteins are described as proteins of which the protein chain, including the secondary structure elements, is tightly folded into a more or less spherical shape (cf. Dairy Science and Technology, 2nd ed. ISBN 0-8247-2763-0). The tertiary structure assumed by a globular protein molecule tends to be such that the non-polar side chains are directed inward to allow interaction with one another and the polar side chains are typically oriented outward such that they are exposed to adjacent polar water molecules.

A globular protein herein is to be understood as a protein which is globular in its non-denatured state. They are distributed in both plant and animal tissues. For instance, albumins can be found in blood (serum albumin), milk (lactalbumin), egg white (ovalbumin), lentils (legumelin), kidney beans (phaseolin), and wheat (leucosin). Globulins can be found in blood (serum globulins), muscle (myosin), potato (tuberin), Brazil nuts (excelsin), hemp (edestin), whey (lactoglobulins, immunoglobulins, and lactoferrins), pea and lentils (legumin, vicilin), and soy. Also, many enzymes and other vegetable proteins are globular proteins. The term globular protein is meant the collection of proteins which are globular in nature, but may contain minute amounts of hydrolysed fragments and/or uncoiled fragments.

Figure 2:
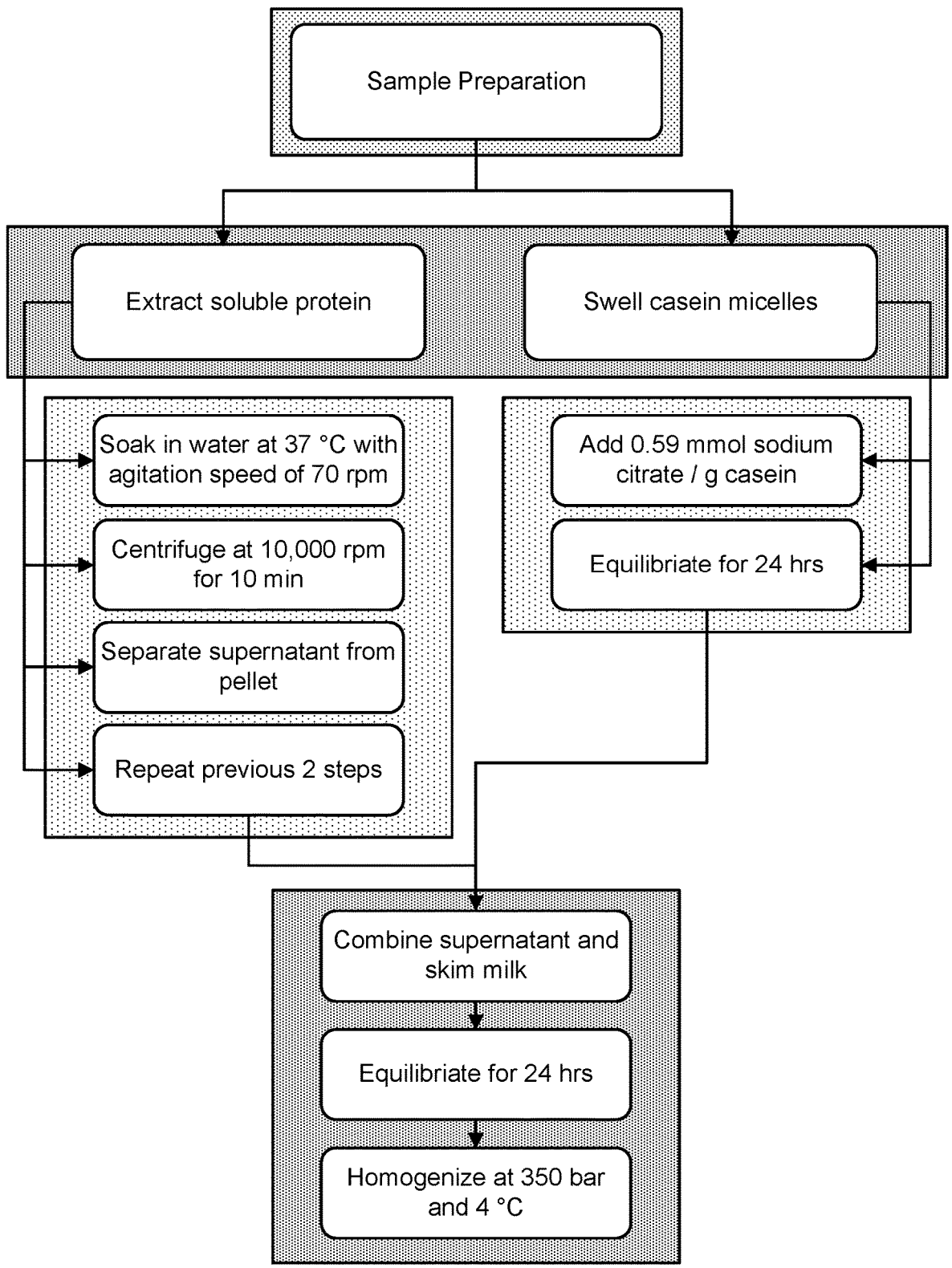
FIG. 2 shows an example of a process for co-dispersion of chia plant protein and casein micelles in milk.
Figure 3:
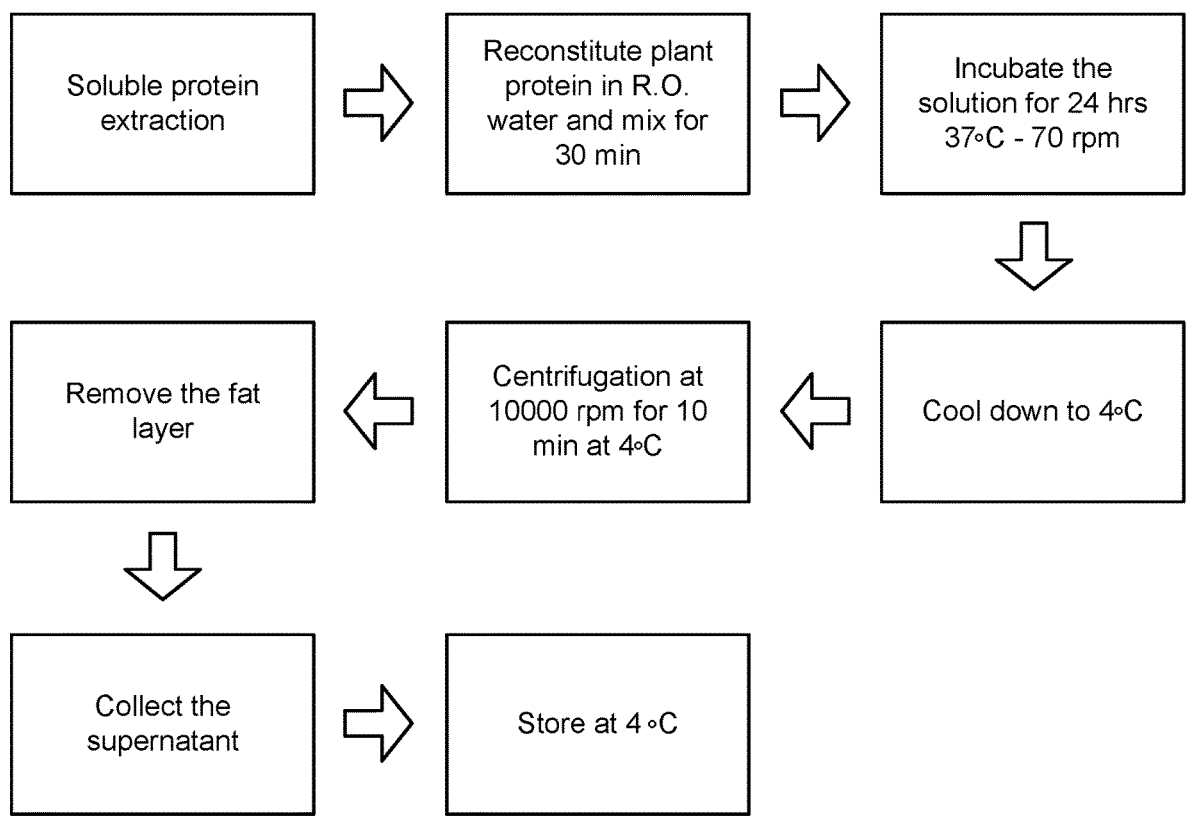
FIG. 3 shows an example of preparation of soluble protein from chia.
Figure 4A:
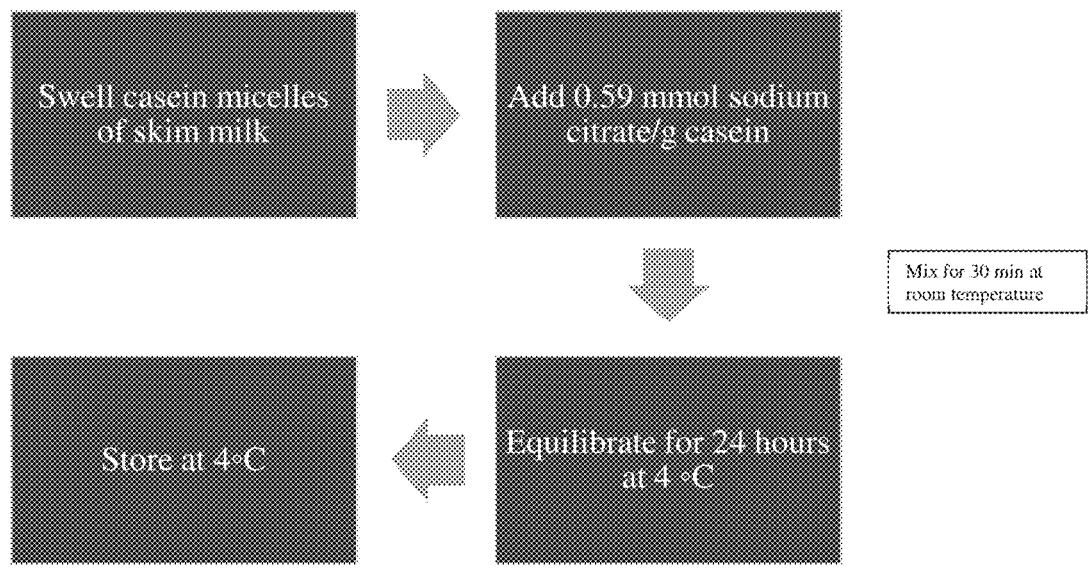
FIG. 4A-B shows co-dispersion process steps. 4A shows an example of preparation of dairy protein from skim milk. 4B shows an example of co-dispersion of chia plant protein and casein micelles in milk.
Figure 4B:
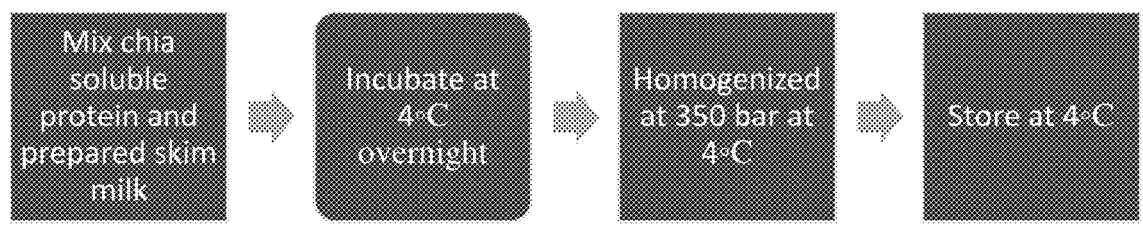

FIGS. 2-4 show an example of the process that can be used to produce a product of a stable colloidal suspension of globular protein material in a dairy product. Both the globular protein material and the dairy product require processing before they can be combined into the final dairy product. These steps can occur simultaneously, so that the globular protein material is prepared at the same time that the dairy product is prepared, or they can happen in tandem, so that one happens before the other.

As discussed above, the globular protein material can be prepared for addition to a dairy product by obtaining globular protein material; soaking the globular protein material in liquid; centrifuging globular protein material/liquid, and separating supernatant from pellet after centrifugation, retaining the supernatant comprising the soluble globular protein. The globular protein material can be soaked in water or any other liquid that would prepare it for the remaining steps of the process. The liquid can be about 30-60° C., and more specifically, can be about 30, 35, 40, 45, 50, 55, or 60° C. During agitation, the globular plant material can be agitated at a speed of about 60-80 rpm. For example, the globular protein material/liquid can be centrifuged at about 8,000-12,000 rpm, and more specifically, at about 10,000 rpm. During the centrifugation step, a globular protein material/liquid can be centrifuged for about 5-15 minutes, and more specifically, for about 10 minutes. The steps of preparing the globular protein material can be repeated 2, 3, 4, 5, or more times as needed.

The sodium citrate can be added to the dairy product at a rate of about 0.40 to 0.70 mmol/g of casein, for example. For example, the sodium citrate could be added at a rate of about 0.59 mmol/g of casein. After sodium citrate is added, the mixture needs to be equilibrated. This can occur for 1, 2, 3, 4, 5, 6, 7, 8, 9, 10, 11, 12, 18, 24, or more hours.

After both the globular protein material and the dairy beverage have been properly prepared, they can be combined into the final product. Once they have been combined, the mixture can be homogenized. This can occur by homogenizing at about 250-400 bar for about 1-10° C., and more specifically at 4° C. One of skill in the art will readily appreciate that homogenization is known to those of skill in the art, and a variety of techniques can be used. The selection and comparison of suitable dispersing machines for dispersion preparation is described in numerous publications.

After homogenization has been completed, any additives, such as stabilizers, flavoring agents, coloring agents, salts, sugars, vitamins, and minerals can be added. Stabilizer may be used alone or in combination with other components. The stabilizing agent can be colloidal microcrystalline cellulose. Colloidal microcrystalline cellulose is available from the market, or can be a mixture of the following compounds or compound selected from microcrystalline cellulose co-processed by subjecting be prepared: sodium carboxymethyl cellulose, maltodextrin, and yellow gum, calcium alginate, sodium carboxymethyl cellulose and sodium stearoyl lactylate, and sodium stearoyl lactylate.

A thickener can also be used. Thickener can be added directly or indirectly to the milk product. Thickeners may be used alone or added together other components. The thickener may be any substance capable of increasing the viscosity of the composition. Polysaccharides are one example of thickeners. Polysaccharides include, but are not limited to, guar gum, locust bean gum, alginate, carrageenan, xanthan gum and mixtures thereof.

A variety of flavors can also be added. Examples of suitable flavoring agents include chocolate, vanilla, honey, coffee, or mocha flavoring agents or strawberry, banana, pineapple, or orange fruit flavoring agents. Flavoring agents may be used alone or in combination with other components. Depending on the flavoring agent used, the amount of flavoring agent may vary widely.

Products Comprising Plant Protein in a Dairy Product

Also disclosed herein is a product produced by the process comprising the steps of a) preparing globular protein material for addition to a dairy product comprising the following steps: i) obtaining globular protein material; ii) soaking globular protein material of step i) in liquid; iii) centrifuging globular protein material/liquid from step ii); iv) separating supernatant from pellet after centrifugation of step iii); v) retaining supernatant comprising soluble globular protein; b) preparing the dairy product for addition of soluble globular protein by adding sodium citrate to casein micelles and equilibrating the casein micelles, thereby obtaining swelled casein micelles; c) adding final product of step a) and to the dairy product; and d) homogenizing the mixture of step c), thereby obtaining a stable colloidal suspension of globular material in a dairy product.

The product produced by this process can remain in colloidal suspension for a long time compared to products which have not undergone this process. For example, the globular proteins and casein micelles can stay in colloidal suspension for at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, or more days after the process is complete.

The product produced by the process disclosed herein can be utilized in a variety of ways. For example, any traditional dairy product use is contemplated, such as yogurt, cheese, ice cream, pudding, flavored milk, or butter. The final product can also be condensed, dehydrated, or evaporated. The product can also be used in any food that normally contains milk or milk solids or milk protein.

The product produced by the method disclosed herein can be a food product, and therefore, can be edible. In an embodiment, the product may be used as a food with an animal, whether a human or other animal. In one embodiment, the product is edible by a human. In another embodiment, the food product is edible by domesticated animals and is especially useful when provided to such animals that would benefit from a high milk phospholipid food product, such as dogs, cats, and the like. The food product can have organoleptic qualities and can be shelf stable or refrigerated. Shelf stable refers to food products that when stored under ambient conditions (such as 72° F. in typical commercial packaging for such products) are safe for consumption and remain palatable. The product can also comprise stabilizers, solubilizers, enhancers, and the like as appreciated by those of skill in the art.

The principle of this invention, blending milk proteins with plant proteins using physical, chemical and biochemical principles and normally available equipment in a dairy processing plant results in a stable blend of the proteins. This blend can be used in its liquid conceived state, or it also can be dried to produce an ingredient to be used in further processing of foods. This can be achieved by any of the current methods for drying milk, whey or protein concentrates, including, but not limited to evaporation and drying in a vacuum chamber; spray drying, freeze drying (also known by the term lyophilization) by air drying or microwave heating and drying.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures, and other reaction ranges and conditions that can be used to optimize the product purity and yield obtained from the described process. Only reasonable and routine experimentation will be required to optimize such process conditions.

Example 1

Process and Product for Producing a Stable Dairy Beverage with Globular Protein Incorporated The effect of homogenization on the stability of the colloidal suspension of chia plant protein and casein micelle in milk over 14 days was investigated. This was done by stabilizing the protein-protein interactions of chia protein and casein micelles. The process shown in FIGS. 2-4 was used to accomplish this.

Figure 5:
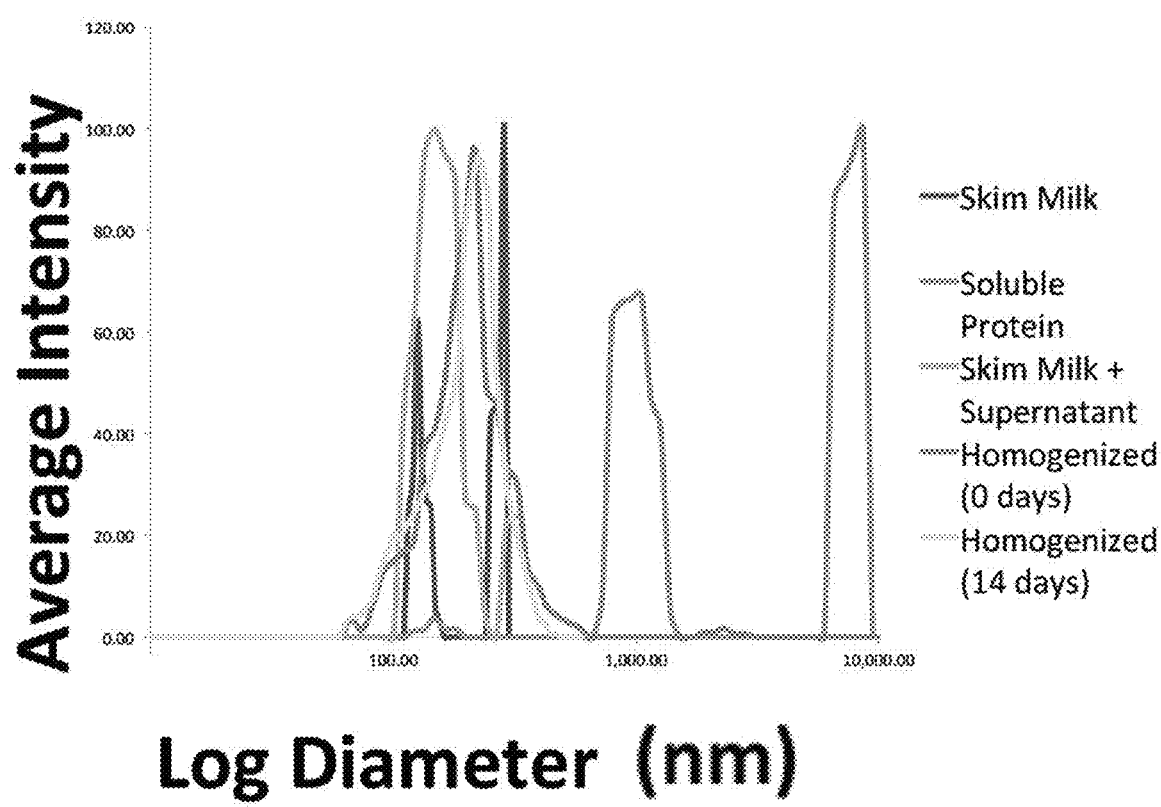
FIG. 5 shows changes in particle size with processing via homogenization over 14 days.
Figure 6:
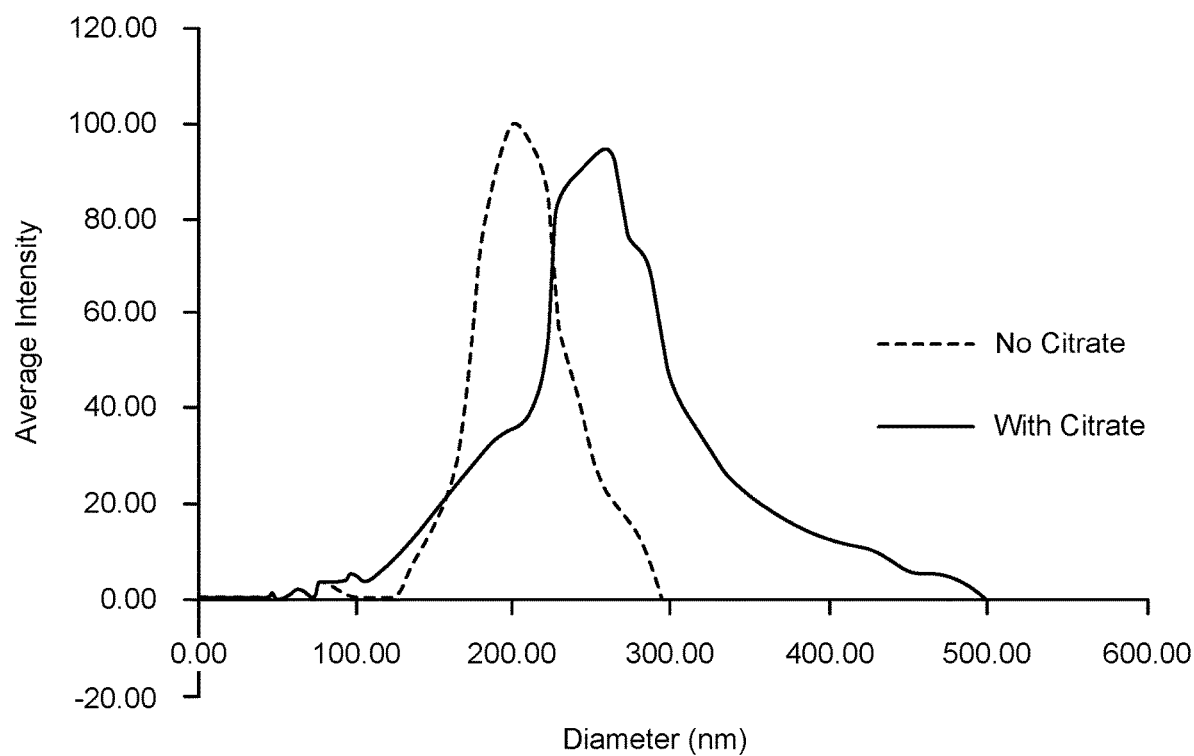
FIG. 6 shows changes in particle size of casein micelles with addition of sodium citrate.
Figure 7A:
FIGS. 7A and 7B shows a suspension of chia protein and casein micelles before processing and after processing.
Figure 7B:

The process comprised the steps of a) preparing globular protein material from chia seed for addition to skim milk comprising the following steps: i) obtaining globular protein material from chia seed; ii) soaking globular protein material of step i) in liquid; iii) centrifuging globular protein material/liquid from step ii); iv) separating supernatant from pellet after centrifugation of step iii); v) retaining supernatant comprising soluble globular protein; b) preparing the skim milk for addition of soluble globular protein by adding sodium citrate to casein micelles and equilibrating the casein micelles, thereby obtaining swelled casein micelles; c) adding the globular proteins obtained from the casein micelles to the skim milk; and d) homogenizing the mixture of step c), thereby obtaining a stable colloidal suspension of chia seed protein in skim milk. The results are shown below in Table 1 and Table 2, and in FIGS. 5-7.

TABLE 1

Stability of colloidal suspension of chia protein and casein micelles

| SAMPLE (350 bar, 1 pass) | Z POTENTIAL (mV) |
|---|---|
| Skim milk (control) | 35.76 ± 10.34 |
| Soluble chia protein | 50.25 ± 5.49 |
| Skim milk + soluble chia protein | 52.58 ± 6.84 |
| Homogenized (450 bar, 1 pass, day 1) | 44.09 ± 11.12 |
| Homogenized (350 bar, 1 pass, day 4) | 51.45 ± 6.06 |
| Homogenized (350 bar, 1 pass, day 10) | 50.92 ± 7.69 |
| Homogenized (350 bar, 1 pass, day 14) | 44.10 ± 6.01 |

TABLE 2

Changes in particle size of casein micelles with addition of sodium citrate

| SAMPLE | EFFECTIVE DIAMETER (nm) |
|---|---|
| Skim milk | 180.07 ± 1.03 |
| Skim milk + sodium citrate (day 2) | 221.20 ± 1.88 |
| Skim Milk + sodium citrate (day 3) | 210.15 ± 3.02 |

The results show that dissociating casein micelles and homogenizing under cold condition (4° C.) and relatively higher pressure (350 bar) effectively lead to codispersion and stabilization of chia plant protein and casein micelles.

Other advantages, which are obvious and are inherent to the invention, will be evident to one skilled in the art. It will be understood that certain features and sub-combinations are of utility and may be employed without reference to other features and sub-combinations. This is contemplated by and is within the scope of the claims. Since many possible aspects may be made of the invention without departing from the scope thereof, it is to be understood that all matter herein set forth or shown in the accompanying drawings is to be interpreted as illustrative and not in a limiting sense.

What is claimed is:

1. A process for preparing a stable suspension of globular protein material in a dairy product, the process comprising:
   step a) preparing the globular protein material for addition to a dairy product comprising the following steps:
   i) obtaining the globular protein material;
   ii) soaking the globular protein material of the step i) in liquid;
   iii) centrifuging the globular protein material/ the liquid from the step ii);
   iv) separating supernatant from pellet after centrifugation of the step iii);
   v) retaining the supernatant comprising soluble globular protein, thereby obtaining a final product;
   step b) preparing the dairy product for addition of soluble globular protein by adding sodium citrate to casein micelles and equilibrating the casein micelles, thereby obtaining swelled casein micelles, wherein the step b) is carried out a temperature range from 4° C. to 10° C.;
   step c) adding the final product of the step a) to the dairy product of the step b), thereby forming a mixture; and step d) homogenizing the mixture of the step c), wherein the step d) is carried out a temperature range from 4° C. to 10° C., thereby obtaining the stable suspension of the globular material in the dairy product.

2. The process of claim 1, wherein the globular protein is obtained from a plant source.

3. The process of claim 2, wherein the plant source is chia, rice, coconut, almond, soy, oat, hemp, peanut, pea, cashew, quinoa, or flax.

4. The process of claim 2, wherein the plant source is seeds.

5. The process of claim 1, wherein the dairy product is milk.

6. The process of claim 1, wherein in the step a), ii), the globular protein material is soaked in water.

7. The process of claim 1, wherein in the step a), ii), the globular protein material is agitated at a speed of about 60-80 rpm.

8. The process of claim 1, wherein in the step a), iii), the globular protein material/liquid is centrifuged at about 8,000-12,000 rpm.

9. The process of claim 1, wherein the steps a) iii) and iv) are repeated at least once.

10. The process of claim 1, wherein the casein micelles are obtained from the dairy product to which they are reintroduced in the step c).

11. The process of claim 1, wherein in the step b), sodium citrate is added at a rate of about 0.40 to 0.70 mmol/g of casein.

12. The process of claim 1, wherein in the step a) iv, the final product is equilibrated for at least 12 hours.

13. The process of claim 1, wherein in the step d), the mixture is homogenized at about 250-400 bar.

14. The process claim 1, wherein in the step d), the mixture is homogenized at about 1-10° C.

15. The process claim 1, wherein fat and/or flavoring is added to the dairy product after the step c).

* * * * *